United States Patent
Schmid

(10) Patent No.: US 9,493,141 B2
(45) Date of Patent: Nov. 15, 2016

(54) WIPER BLADE ARRANGEMENT AND CONNECTING ARRANGEMENT HAVING A WIPER BLADE ARRANGEMENT AND A WIPER ARM

(75) Inventor: Heiko Schmid, Oberriexingen (DE)

(73) Assignee: Daimler AG, Stuttgart (DE)

( * ) Notice: Subject to any disclaimer, the term of this patent is extended or adjusted under 35 U.S.C. 154(b) by 492 days.

(21) Appl. No.: 13/885,419

(22) PCT Filed: Nov. 11, 2011

(86) PCT No.: PCT/EP2011/005664
§ 371 (c)(1),
(2), (4) Date: Jul. 16, 2013

(87) PCT Pub. No.: WO2012/065700
PCT Pub. Date: May 24, 2012

(65) Prior Publication Data
US 2013/0291328 A1 Nov. 7, 2013

(30) Foreign Application Priority Data
Nov. 16, 2010 (DE) .................. 10 2010 052 314

(51) Int. Cl.
*B60S 1/38* (2006.01)
*B60S 1/40* (2006.01)
*B60S 1/52* (2006.01)

(52) U.S. Cl.
CPC .......... *B60S 1/40* (2013.01); *B60S 1/3805* (2013.01); *B60S 1/3862* (2013.01); *B60S 1/4048* (2013.01); *B60S 1/524* (2013.01); *B60S 2001/4058* (2013.01)

(58) Field of Classification Search
CPC ............................. B60S 1/3862; B60S 1/524
USPC ........................................................ 15/250.04
See application file for complete search history.

(56) References Cited

U.S. PATENT DOCUMENTS

| 8,381,348 B2 * | 2/2013 | Egner-Walter et al. | B60S 1/381 15/250.04 |
| 2011/0107541 A1 | 5/2011 | Caillot et al. | |

(Continued)

FOREIGN PATENT DOCUMENTS

| DE | 691 01 340 T2 | 6/1994 |
| DE | 10 2007 062 304 A1 | 6/2009 |

(Continued)

OTHER PUBLICATIONS

DE102008021457 (machine translation), 2009.*

(Continued)

*Primary Examiner* — Monica Carter
*Assistant Examiner* — Andrew A Horton
(74) *Attorney, Agent, or Firm* — Crowell & Moring LLP

(57) ABSTRACT

A wiper blade arrangement having an attachment element that holds a wiper blade, which can be secured on a wiper arm of a windscreen wiper system of a vehicle. The wiper blade is coupleable via the attachment element to at least one channel for washer fluid, which can be introduced from the wiper arm into the attachment element. The attachment element allows a relative movement of the wiper blade with respect to the wiper arm. For this, the attachment element has a rider designed for holding a spring strip of the wiper blade, which includes a wiper-arm-side upper part and a wiper-blade-side lower part, which are connected to each other via a central part of the rider, which encloses at least one line for the washer fluid, wherein the central part has greater elasticity than the upper part and the lower part of the rider.

10 Claims, 6 Drawing Sheets

(56) References Cited

U.S. PATENT DOCUMENTS

2011/0113580 A1* 5/2011 Caillot et al. ......... B60S 1/3862
　　　　　　　　　　　　　　　　　　　　　　　　15/250.01
2011/0185531 A1　　 8/2011 Egner-Walter et al.

FOREIGN PATENT DOCUMENTS

| DE | 10 2008 021 457 A1 | 11/2009 | |
| DE | 10 2008 049 269 A1 | 4/2010 | |
| WO | WO 2006/106006 A1 | 10/2006 | |
| WO | WO 2010/006776 A1 | 1/2010 | |
| WO | WO 2010006775 A1 * | 1/2010 | ............ B60S 1/3862 |
| WO | WO 2010/034445 A1 | 4/2010 | |
| WO | WO 2010/034447 A1 | 4/2010 | |

OTHER PUBLICATIONS

International Search Report with English translation dated Mar. 9, 2012 (six (6) pages).

German Office Action dated Mar. 29, 2011 (three (3) pages).

* cited by examiner

WIPER BLADE ARRANGEMENT AND CONNECTING ARRANGEMENT HAVING A WIPER BLADE ARRANGEMENT AND A WIPER ARM

BACKGROUND AND SUMMARY OF THE INVENTION

Exemplary embodiments of the present invention relate to a wiper blade arrangement having an attachment element that holds a wiper blade, which can be secured on a wiper arm of a windscreen wiper system of a vehicle. The wiper blade can be coupled via the attachment element to at least one channel for washer fluid, which can be introduced from the wiper arm into the attachment element. The attachment element allows relative movement of the wiper blade with respect to the wiper arm. Furthermore, exemplary embodiments of the present invention relate to a connecting arrangement, which comprises such a wiper blade arrangement and a wiper arm of a windscreen wiper system of a vehicle.

German patent document DE 10 2008 021 457 A1 describes a wiper blade that can be secured to a wiper arm of a windscreen wiper system by means of a two-part adaptor. Two connecting lines are provided on the wiper arm side, which are connected to two channels arranged on the upper part of the adaptor, the adaptor, together with the wiper blade, is introduced from the front, so in the longitudinal stretching direction of the wiper arm, into an end region of the wiper arm. The upper part of the adaptor is installed flexibly on a hinge bolt that clamps down onto a lower part of the adaptor. Two channels for washer fluid are also designed at the lower part of the adaptor, which transgresses a spring strip of the wiper blade in a sliding manner, via which lines running along the wiper blade can be loaded with washer fluid. Respective connecting pieces of the channels attached to the upper and lower parts of the adaptor are connected to one another via line sections designed as corrugated tubes. The line sections, which are bypassed externally along respective front faces of the upper and lower parts of the adaptor at these parts, consist of a highly-flexible polymer, for example a thermoplastic elastomer. Due to these line sections that enable length compensation, the lower part of the adaptor can carry out a relative movement with respect to the upper part of the adaptor that is secured to the wiper arm, without this relative movement being hindered by the fixed channels.

PCT patent publication WO 2006/016 006 A1 describes a device for the flexible connection of a wiper blade to a wiper arm, wherein an adaptor is pushed downwards towards a connecting element, which holds spring strip of a wiper blade. During the attaching of the adaptor to a connecting element of the wiper arm, snap-on protrusions lock on to bars, which are arranged on limbs of the connecting element that has a U-shape in its cross section.

German patent document DE 691 01 340 T2 describes a hinge joint between a wiper arm and a wiper blade. In the wiper arm, which has a U-shape in its cross section, an opening for receiving a bolt is provided, which can be displaced along the wiper arm. If the bolt is pushed away from the free end of the wiper arm, i.e. backwards, a receiver provided on the bolt releases a hinge axis, which connects two longitudinal walls of a chuck. The chuck is inserted into an opening, which is designed in a main bracket of the wiper blade, wherein clamps designed on the chuck latch into recesses provided on the main bracket.

German patent document DE 10 2008 049 269 A1 and PCT patent publication WO 2010/034 445 A1, which claims the priority of German patent document DE 10 2008 049 269 A1, also describe a connection of a wiper blade to a wiper arm via an adaptor, which couples the wiper blade to lines for washer fluid, which is fed from the wiper arm into the wiper blade. Also, here, the adaptor, together with the wiper blade, is installed onto this in the longitudinal extension direction of the wiper arm. An adaptor upper part is flexibly connected to an adaptor lower part via a hinge bolt, which is fed through the adaptor lower part. Two tube pieces are arranged on a front face of the adaptor upper part, which receives the washer fluid from the lines running in the adaptor upper part in the longitudinal extension direction of the wiper arm. Both tube pieces feed the washer fluid into two lines running in the longitudinal extension direction of the wiper blade. The tube pieces that are bent downwards have a loop, due to which they can follow a movement of the wiper blade relative to the wiper arm, without tension being exerted onto the lines. The tube pieces are additionally formed from a highly elastic material, such that, despite the lines arranged on the adaptor, the pivoting movement of the adaptor lower part with respect to the adaptor upper part is not hindered.

It is hereby to be regarded as disadvantageous that the lines for the washer fluid are comparatively susceptible to being damaged. In addition, the connection of the adaptor, together with the wiper blade, to the wiper arm is comparatively laborious for an operator.

Exemplary embodiments of the present invention provide a particularly robust wiper blade arrangement of the type cited above, as well as a connecting arrangement having such a wiper blade arrangement and a wiper arm, which is particularly simple in its use.

The wiper blade arrangement according to the invention comprises an attachment element, which holds a wiper blade. The attachment element can be secured to a wiper arm of a windscreen wiper system of a vehicle. The wiper blade can be coupled via the attachment element to at least one channel for washer fluid, which can be introduced from the wiper arm into the attachment element. The attachment element is hereby designed in such a way that a relative movement of the wiper blade with respect to the wiper arm is enabled by the attachment element. For this, the attachment element has a rider designed for holding a spring strip of the wiper blade, which comprises a wiper-arm-side upper part and a wiper-blade-side lower part, which are connected to each other via a central part of the rider, which encloses at least one line for the washer fluid, wherein the central part has greater elasticity than the upper part and the lower part of the rider.

Due to the flexible central part with a high level of elasticity, the lower part can move with respect to the upper part and, accordingly, the wiper blade can be adapted to the course of the windscreen surface during the wiping of the screen, which is typically spherically curved. Due to the fact that the central part encloses the at least one line, which can be coupled to the wiper-arm-side channel for the washer fluid, particularly good protection of the at least one line is provided. Thus, a particularly robust wiper blade arrangement is created. The at least one wiper-blade-side channel for the washer fluid, which is installed fixedly in the region of the wiper arm, can be decoupled from the pivoting movements of the wiper blade by the provision of the central part holding the upper part at a distance to the lower part. The flexible central part having greater elasticity than the upper part and lower part thus does not receive the relative movement between the wiper arm and wiper blade in the same way as a hinge joint connecting the upper part to the lower part.

Due to the fact that the abrasion-susceptible central part, which allows the relative movement between wiper arm and wiper blade, is part of the attachment element, this is also exchanged during the exchange of the wiper blade together with the attachment element. It can thus be ensured that the relative movement between wiper blade and wiper arm remains smooth.

In an advantageous embodiment of the invention, the attachment element can be secured to the wiper arm via a framework element, which is brought into contact with at least two opposite external sides of the upper part. Such a framework element enables a particularly good transfer of forces during the movement of the wiper arm towards the wiper blade. If the framework element completely encloses the upper part on the external peripheral side, a particularly secure fitting of the upper part to the framework element, and thus particularly good force transmission from the wiper arm into the attachment element, is provided.

It has hereby been proven to be advantageous if the framework element is installed on a rotational axis designed on the lower part. Thus, the framework element can transfer forces from the fixed upper part to the fixed lower part, without these forces having to be transferred via the elastic central part. Accordingly, the central part can have a particularly high level of elasticity, since the force-transmitting connection of the upper part to the lower part is effected by the framework element.

It is preferred for the attachment element to be able to be installed onto the wiper arm in an installation direction, which runs at right angles to a wiping surface that can be defined by the wiping movement of the wiper blade. Such an installation of the attachment element to the wiper arm can be carried out particularly simply by an operator and can be determined intuitively particularly well. Thus, a particularly high level of safety from defective installation is provided. At the same time, the transfer of washer fluid from the wiper-arm-side channel into the attachment element, and from there into the wiper blade, can take place via the attachment element as soon as this has been secured to the wiper arm in the installation direction.

Since a contact pressure acts on the wiper arm in the wiper blade located on the screen of the vehicle, which presses the wiper blade against the screen, the attachment element that can be installed onto the wiper arm in the installation direction perpendicular to the wiping surface can be moved, and with this, the wiper blade can also be moved securely over the screen by means of the wiper arm, as soon as the wiper arm charges the attachment element with the contact pressure in the installation direction.

In order to achieve a particularly secure fixing of the attachment element to the wiper arm, provision can be made according to a further advantageous embodiment of the invention for the attachment element to have at least one projection protruding above a side wall of the same, which can be inserted into a recess on the wiper arm that is open in the installation direction during installation onto the wiper arm.

Additionally or alternatively, the attachment element can have at least one guide element, which is guided on a wiper-arm-side guide element during installation onto the wiper arm. This facilitates the installation of the attachment element onto the wiper arm. A particularly simple installation of the attachment element onto the wiper arm or a removal of the attachment element from the same can be achieved if the guide elements have a lead-in chamfer.

Such guide elements, which in particular have lead-in chamfers, can be provided on both side walls of the attachment element. Alternatively, the attachment element can have a guide element on only one side wall, which corresponds to the wiper-arm-side guide, such that a permutation protection is provided. Then the attachment element can only be installed onto the corresponding wiper arm, for example a passenger-side wiper blade onto a passenger-side wiper arm and a driver-side wiper blade onto a driver-side wiper arm. If, on the wiper arm, there is no wiper-arm-side guide corresponding to the wiper-blade-side guide element, the wiper arm prevents the connection of the attachment element to the same, and the operator will notice the attempt to installed the wiper blade on the wiper arm that is not provided for this.

It has been proven to be further advantageous if the attachment element has at least one electrical plug connector, which can be connected to the wiper arm with a wiper-arm-side electrical connection during the connection of the attachment element. In this way, during the connection of the attachment element, both the coupling to the channel that guides the washer fluid and the electrical connection can be ensured. The electrical plug connector also provides for the attachment element being able to be heated, such that, by inserting thermal heat into the attachment element, the elasticity of the central part can be ensured even at low ambient temperatures.

Additionally, the electrical plug connector of the attachment element is preferably coupled to a wiper-blade-side electrical heat conductor, such that the wiper blade can also be charged with heat energy. This is advantageous for preventing the wiper blade from being frozen to the screen of the vehicle. Moreover, the washer fluid applied to the screen by the wiper blade can be heated. In this way, the screen can be de-iced. In addition, even at low temperatures, washer fluid discharge from the wiper blade can be ensured.

The connecting arrangement according to the invention comprises a wiper blade arrangement according to the connection and a wiper arm of a windscreen wiper system of a vehicle. Here, a slider arranged on the wiper arm is provided for the fixed holding of the attachment element on the wiper arm, which can be displaced along the wiper arm from an installation position into a functional position securing the attachment element. However, in the installation position, the attachment element can be released from the wiper arm. Such a connecting arrangement can be used particularly simply, since, for installation the attachment element onto the wiper arm, the attachment element, together with the wiper blade, does not need to be moved from the installation position into the functional position. In fact, the attachment element remains in its installation position and only the slider is moved along the wiper arm, so as to secure the attachment element from self-releasing from the wiper arm. This considerably facilitates the use of the wiper blade arrangement during installation onto the wiper arm or during removal from the wiper arm.

It is preferred for at least one display to be provided on the wiper arm, by means of which a passing of the slider into the functional position and/or the installation position can be displayed to an operator. Thus, it can be ascertained by the operator in a particularly simple manner whether the slider is located in the functional position, in which it secures the attachment element, or not. The display can be designed as a symbol and/or as an aperture in the wiper arm, which is/are covered or released during the movement of the slider.

Additionally or alternatively, a character can be provided, which refers to the movement of the slider into the functional position or closing position that is to take place, if the slider is still located in the installation position.

It is furthermore advantageous if the wiper arm has at least one latching notch, which, in the functional position and/or the installation position of the slider, engages with a latching nose arranged on the slider. The locking of the latching nose in the latching notch can be determined optically, aurally and sensitively. In this way, it can be confirmed to the operator that the slider is located in the functional position or the installation position. It is particularly advantageous if one and the same latching nose is engaged in the functional position with a first latching notch and with a second latching notch in the installation position. Alternatively, however, only one latching notch can be provided, which is allocated to one of the two positions. Also, the wiper arm and the slider can have the latching nose and the latching notches respectively.

It has furthermore been proven to be advantageous if the slider has a back and two limbs, wherein at least one projection that encompasses the wiper arm from below and/or secures the attachment element in the functional position of the slider is arranged on the limbs of the slider. If projections encompass the wiper arm from below, impact protection is provided by the slider when the wiper arm impacts onto the screen without the wiper blade installed thereon, for example due to inattention by the operator after the wiper blade has been removed from the wiper arm. Such impact protection is in particular then particularly effective if the wiper arm is formed from a metal and the slider is formed from a flexible material, for example a polymer. Additionally, particularly good guiding of the slider along the wiper arm is guaranteed by the slider that encompasses the wiper arm from below.

The projections on the limbs of the slider can secure the attachment element in the functional position of the slider, while projections provided on the attachment element, for example bar studs, abut on the projections in the functional position of the slider, which are separated from the limbs of the slider.

In a further advantageous embodiment of the invention, the connecting arrangement comprises a connecting element, which comprises the at least one wiper-arm-side channel for the washer fluid, and which can be locked on to the wiper arm. In this way, it can be ensured that the connecting element is also held securely to the wiper arm after the attachment element has been released from the wiper arm.

At the same time, a wiper-arm-side electrical connection is preferably provided by the connecting element. Then both the supply of washer fluid in the wiper blade and of electrical energy for heating the wiper blade and/or washer fluid can take place via the connecting element.

It is hereby advantageous if the slider can be locked on to the connecting element by a movement into the functional position. Then the slider, in its functional position, serves to fix the connecting element.

At least one electrical heat conductor can be arranged on the connecting element, by means of which the washer fluid can be heated in the region of the wiper arm. Thus, the washer fluid can already be heated on its way along the wiper arm, so before it has reached the attachment element.

If the connecting element comprises a wiper-arm-side electrical connection for the electrical heat conductor installed in the wiper blade, the washer fluid can be heated both on the way to the attachment element and from the attachment element to wiper-blade-side outlets.

Finally, it has indeed been proven to be advantageous if the slider and/or wiper arm has a recess, which is designed to receive a component of the wiper blade during a movement of the wiper blade relative to the wiper arm. In this way, the slider and the wiper arm can be closed to a particularly great extent in an optically and acoustically advantageous manner, and the relative movement of the wiper blade with respect to the wiper arm is still enabled by the recesses.

The features and combinations of features specified in the description above and the features and combinations of features specified in the description of the figures and/or in the figures only below can be used not only in the combination specified in each case, but also in other combinations or on their own without exceeding the scope of the invention.

BRIEF DESCRIPTION OF THE DRAWING FIGURES

Further advantages, features and details of the invention arise from the claims, the description of preferred embodiments below and with the aid of the following figures:

DETAILED DESCRIPTION

Figure 1:
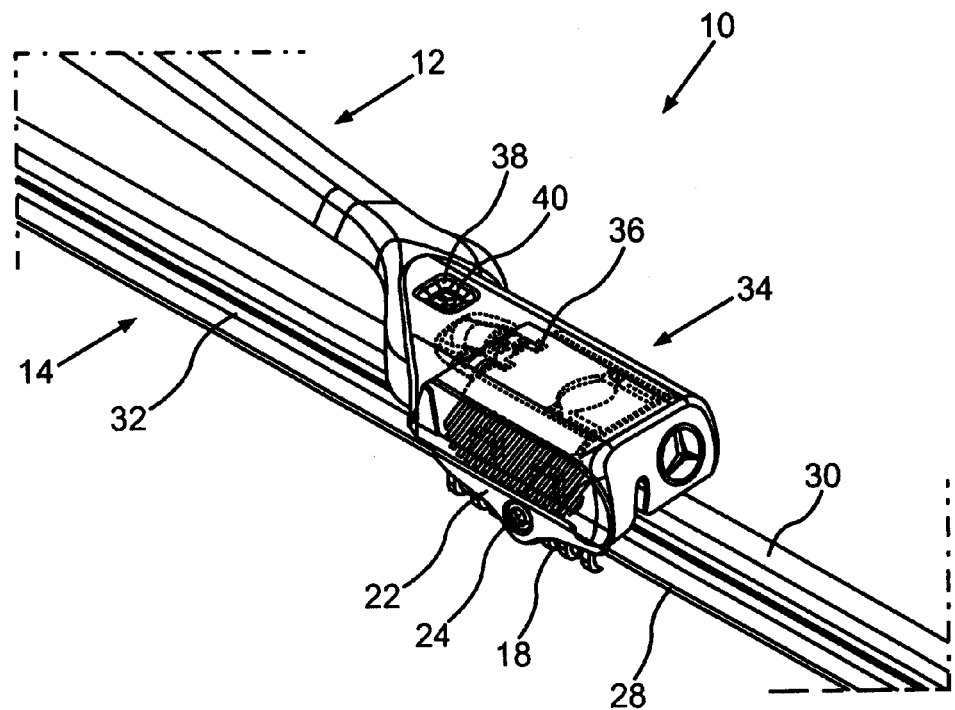
FIG. 1 illustrates a water-bearing wiper blade held moveably on a wiper arm of a windscreen wiper system of a vehicle by means of an adaptor.

FIG. 1 shows a connecting arrangement 10 of a windscreen wiper system of a vehicle, wherein a wiper arm 12 is coupled to a water-bearing wiper blade 14. The wiper blade 14 is held to the wiper arm 12 by means of an adaptor 16 (cf.

Figure 2:
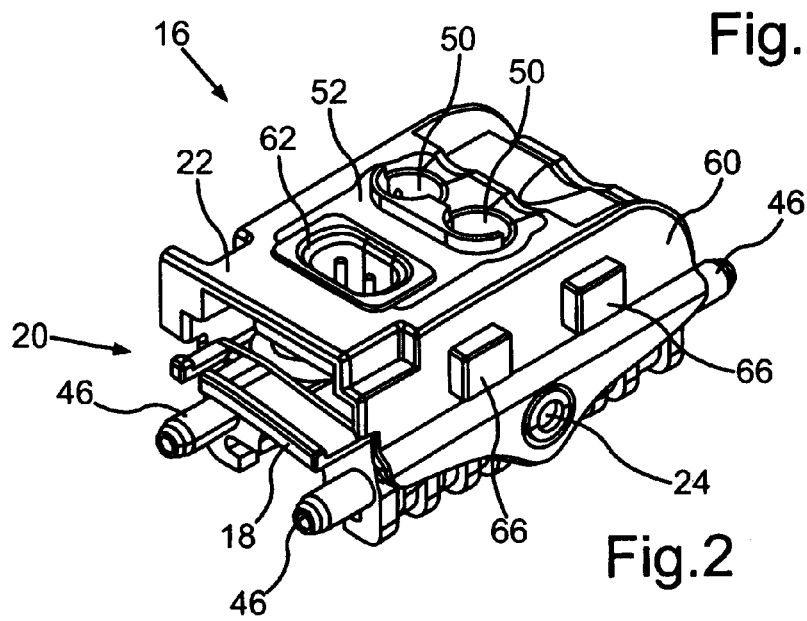
FIG. 2 illustrates the adaptor with a guide frame, which transfers forces from an upper part of the adaptor to a lower part of the same.

FIG. 2), wherein only one lower part 18 of a rider 20 (cf. FIG. 3) and one piece of a guide frame 22 can be seen of the adaptor 16 in FIG. 1, which is installed rotatably on a rotational axis 24 designed on the lower part 18.

The lower part 18 of the rider 20 holds a spring strip 26 (cf. FIG. 9) and a blade rubber 28 of the wiper blade 14. The wiper blade 14 furthermore comprises a spoiler 30 and lines 32 for washer fluid. The washer fluid can leave via outlets (not shown) coming from the wiper arm 12 from both lines 32 installed in the wiper blade 14.

A sliding bolt 34, which is pre-installed onto the wiper arm 12, is, in FIG. 1, moved into a functional position and, in the present case, moved backwards in the longitudinal extension direction of the wiper arm 12, so to the left as per FIG. 1. In this functional position, the sliding bolt 34 impedes the adaptor 16 and thus the wiper blade 14 on a self-release from the wiper arm 12.

Figure 4:
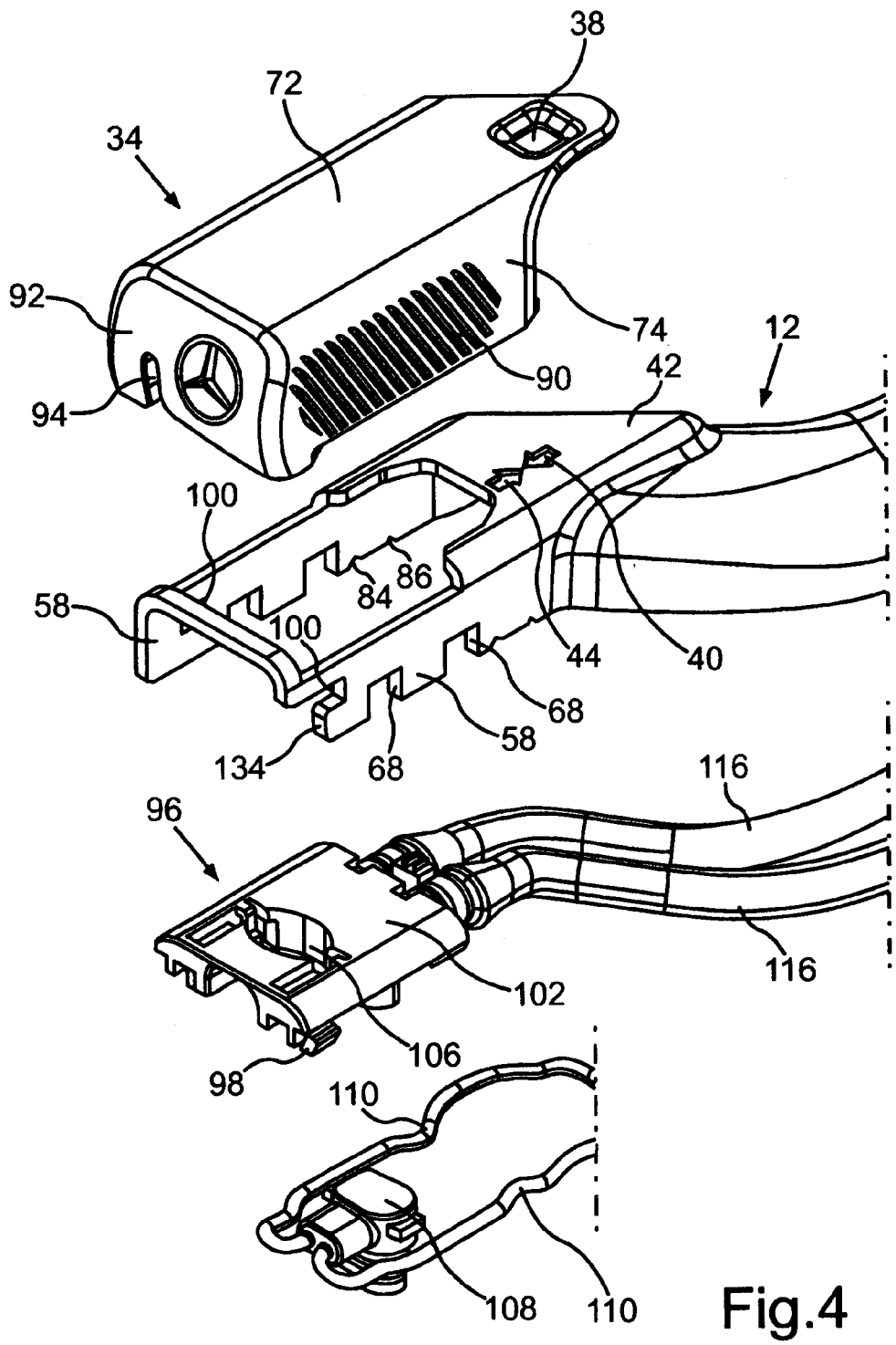
FIG. 4 illustrates an exploded view showing a sliding bolt for securing the adaptor to the wiper arm, the wiper arm itself, a water plug and an electrical connection in perspective views.

An opening 38 is provided in a back 36 of the sliding bolt 34, which enables an operator to look at a symbol 40, which is applied to a back 42 of the wiper arm 12 (cf. FIG. 4). The symbol 40, which displays the direction in which the sliding bolt 34 can be displaced along the wiper arm 12, is designed in the present case as an arrow symbol. If the sliding bolt 34 is moved forwards into its installation position that enables the installation or removal of the adaptor 16 (cf. FIG. 9), the opening 38 is located in the back 36 of the sliding bolt 34 at the level of a second symbol 44 on the back 42 of the wiper arm 12, which is also designed as an arrow symbol in the present case, although this is shown in the opposite direction (cf. FIG. 4). In alternative embodiments, other displays can be provided, which optically illustrate to an operator a passing of the sliding bolt 34 into the functional position or installation position.

As particularly illustrated in FIG. 2, the lower part 18 of the rider 20 comprises four connecting pieces 46, which, in a wiper blade arrangement 48 (cf. FIG. 9) comprising the wiper blade 14 and the adaptor 16, are coupled to the lines 32 that apply the washer fluid to the screen of the vehicle. The washer fluid coming from the wiper arm 12 is introduced into the adaptor 16 via two channel pieces 50, the upper-side openings of which are arranged in the region of an upper part 52 of the slider 16. Coming from the upper part 52, both channel pieces 50, which are parallel to each other, come through a central part 54 of the rider 20 (cf. FIG. 3). In the lower part 18 of the rider 20, both channel pieces 50 branch out towards the connecting pieces 46 departing from said pieces in the perpendicular direction.

Figure 3:
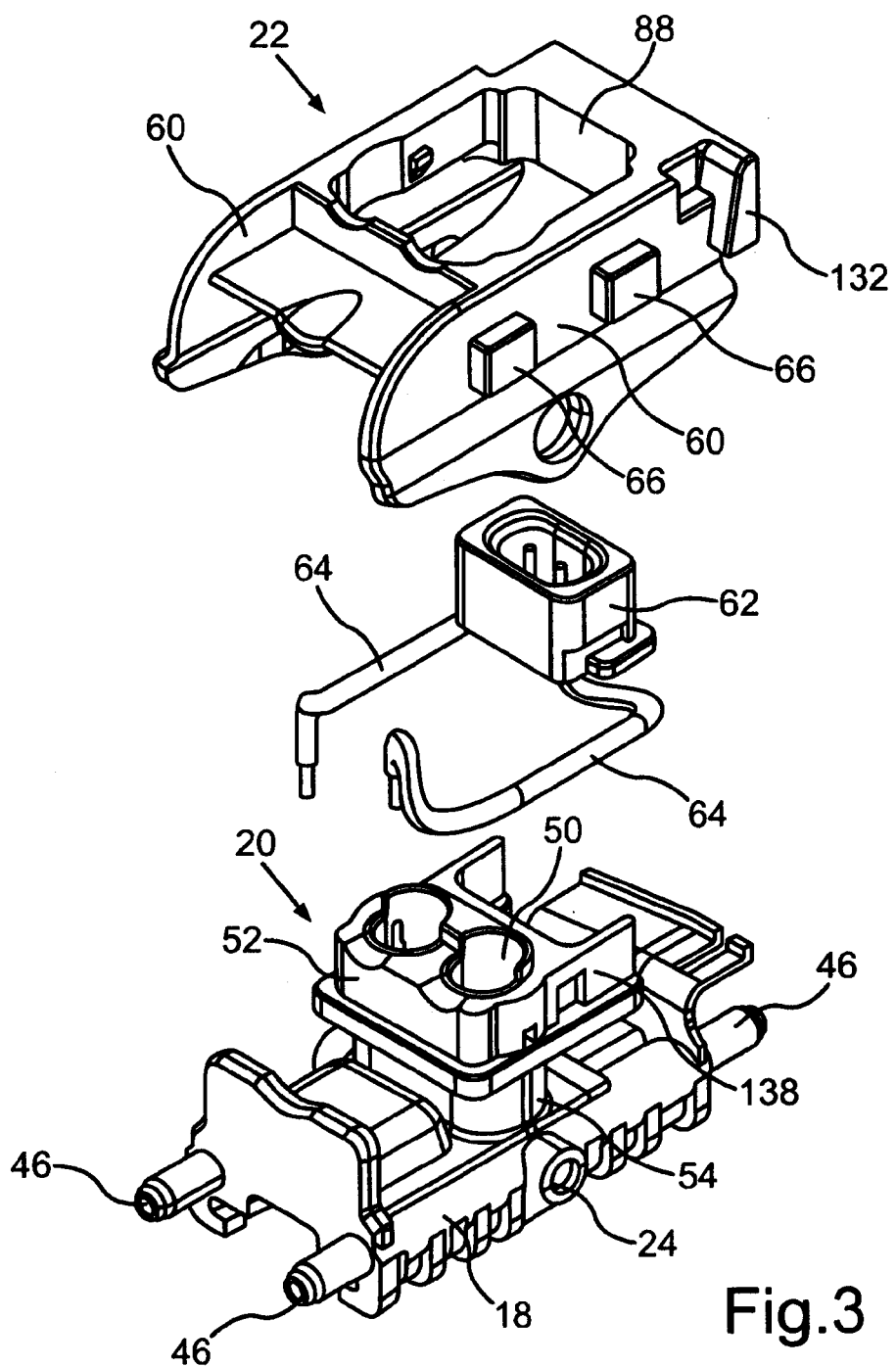
FIG. 3 illustrates the adaptor in an exploded view, which shows the guide frame, an electrical plug connector and a rider of the adaptor in respective perspective views.

The central part 54 that is not covered by the guide frame 22 in the exploded view in FIG. 3 is designed flexibly and elastically, while the upper part 52 and the lower part 18 of the rider 20 are fixed. In this way, the adaptor 16 enables a relative movement of the wiper blade 14 relative to the wiper arm 12 and indeed in a plane that runs perpendicular to the rotational axis 24 and that coincides with the longitudinal extension direction of the wiper blade 14.

Figure 8:
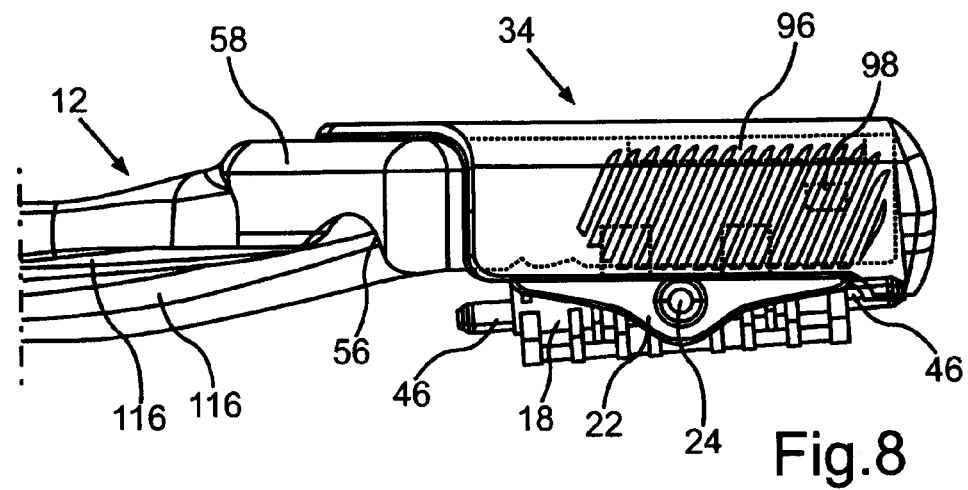
FIG. 8 illustrates in a side view, the wiper arm with the sliding bolt moved backwards in its functional position, which prevents the adaptor from self-releasing from the wiper arm.

FIG. 8 shows a deflection of the lower part 18 from the wiper arm 12, wherein a front region of the wiper blade 14 is pivoted with respect to the horizontal as far upwards as possible, and a rear region of the wiper blade 14 is pivoted as far downwards as possible. The divergence from the horizontal of the wiper blade 14 moving with respect to the wiper arm 12 during the wiping operation is approximately +/−3°. This rotational movement of the wiper blade 14 with respect to the wiper arm 12 enables the wiper blade 14 to be able to be adapted to the course of the screen surface during the wiping of the screen, which is typically spherically curved. In the relative movement of the wiper blade 14 with respect to the wiper arm 12 according to FIG. 8, wherein the wiper blade 14 (not shown) held by the lower part 18 of the rider 20 is pivoted, the spoiler 30 of the wiper blade 14 can come to lie in a recess 56, which is designed in a limb 58 of the wiper arm 12 (FIG. 8).

As is shown in FIG. 2, the upper part 52 of the slider 16 is enclosed by the guide frame 22. Accordingly, in the connected state of the rider 20 to the guide frame 22, external sides 138 of the upper part 52 are in contact with internal sides of a recess 88 in the guide frame 22 (cf. FIG. 3).

In the connected state of the adaptor 16 to the wiper arm 12, side walls 60 of the guide frame 22 abut on the internal sides of both limbs 58 of the wiper arm 12 (cf. FIG. 3 and FIG. 4). Due to the fact that the side walls 60 of the guide frame 22 do not only enclose the upper part 52 in the manner of a cage, but rather recesses are rotatably installed in the side walls 60 on the rotational axis 24 designed on the lower part 18, a force transmission takes place from the wiper arm 12 via the guide frame 22 onto the lower part 18, without the flexibility of the lower part 18 with respect to the upper part 52 of the rider 20 being limited hereby.

The central part 54 that ensures this flexibility of the lower part 18 with respect to the upper part 52 (cf. FIG. 3), in particular in a two-component injection-moulding process in the production of the rider 20, formed from a polymer that has greater elasticity than a polymer that is comparatively more fixed and that is used for the lower part 18 and the upper part 52.

The embodiment of the adaptor 16 that is presently shown as an example is not only designed to introduce washer fluid into the wiper blade 16 but also to introduce electrical heat energy. For this, an electrical plug connector 62 is provided in the adaptor 16 (cf. FIG. 2), which is shown as a single part in FIG. 3, together with two electrical leads 64 that depart from this. Furthermore, FIG. 3 shows, in an overall view with FIG. 2, that the recess 88 provided in the guide frame 22 is set up to receive both the upper part 52 and the plug connector 62.

FIG. 2 furthermore shows that two projections are provided on the side walls 60 of the guide frame 22 in the form of two bar studs 66 per side wall 60. If the adaptor 16 is introduced from below into the end region of the wiper arm 12 having a U-profile in its cross-section (cf. FIG. 9), the bar studs 66 are inserted into corresponding recesses 68 that are open from below, which are provided in the limbs 58 of the wiper arm 12 in its end region thereof (cf. FIG. 4).

Figure 9:
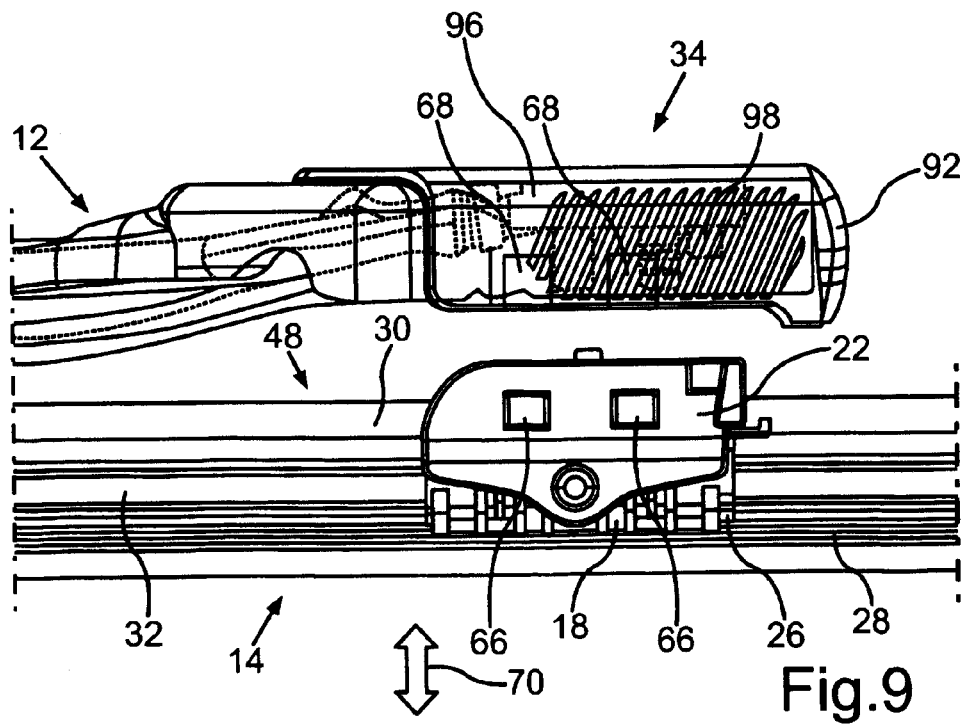
FIG. 9 illustrates the wiper arm with a sliding bolt moved forwards into a removal position and the wiper blade arrangement moved downwards from the wiper arm, which comprises the adaptor and the wiper blade held thereby.

If the four bar studs 66 are inserted into the respective recesses 68 and if, additionally, the side walls 60 of the guide frame 22 are in contact with the internal sides of the limbs 58, the adaptor 16 is received in a secured position in the end region of the wiper arm 12 both in the longitudinal extension direction of the wiper arm 12 and in the direction of the wiping movement of the wiper arm 12. The sliding bolt 34 additionally secures the adaptor 16 against a self-release into the installation direction, which is the same as a removal direction and is illustrated in FIG. 9 by a movement arrow 70.

Figure 5:
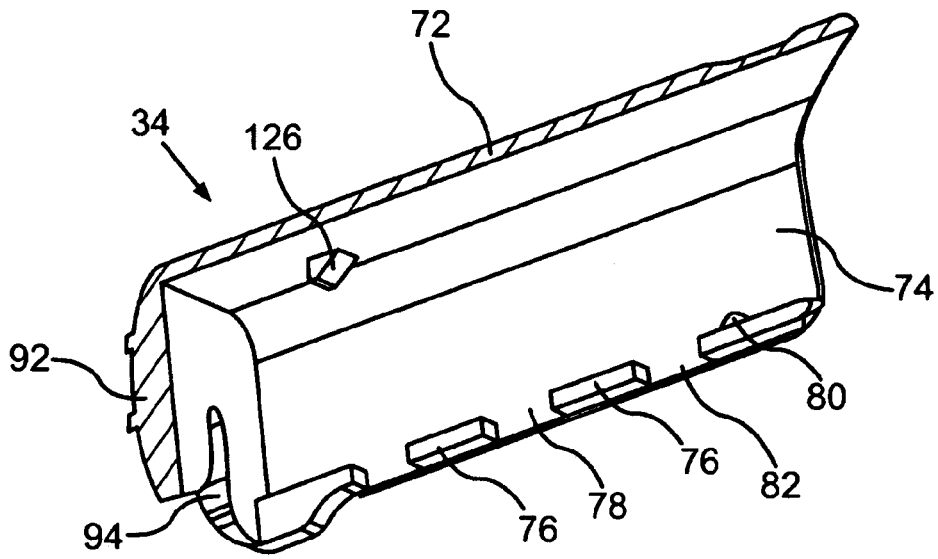
FIG. 5 illustrates a sectional view of the sliding bolt according to FIG. 4.

The sliding bolt 34 has a back 72 and two limbs 74 (cf. FIG. 4). As arises from FIG. 5, two respective rails 76 are arranged on the internal sides of the limbs 74, which protrude inwards from these. If the sliding bolt 34 is moved backwards from its installation position shown in FIG. 9 and enabling an installation or removal of the wiper blade arrangement 48 into its functional position securing the adaptor 16 (cf. FIG. 8), the rails 76 lock the recesses 68 that are designed in the limbs 58 of the wiper arm 12 and that are open from below, in which the bar studs 66 of the guide frame 22 are located. In addition, the rails 76 reach over the limbs 58 of the wiper arm 12 on the underside and thus serve as impact protection if the wiper arm 12 strikes the screen without an installed wiper blade 14.

In the installation position of the sliding bolt 34, a region 78 arranged between both rails 76 and a region 82 arranged between the rear rail 76 and a latching nose 80 of the sliding bolt 34 (cf. FIG. 5) enables the bar studs 66 to be able to be introduced into the recesses 68 in the limbs 58 of the wiper arm 12 unhindered.

As is shown in particular in FIG. 4, a respective front latching notch 84 and a rear latching notch 86 are provided in both limbs 58 of the end region of the wiper arm 12. If the sliding bolt 34 is located in the installation position shown in FIG. 9, the latching nose 80 arranged on the inner side of the limb 74 of the sliding bolt 34 (cf. FIG. 5) is in engagement with the front latching notch 84. In the functional position of the sliding bolt 34, which secures the adaptor, the latching nose 80 is, however, in engagement with the rear latching notch 86.

The locking of the latching nose 80 into the respective latching notch 84, 86 can clearly be detected by the operator aurally and sensitively, so by touch. In addition, with the aid of the symbol 40, 44 that can now be seen through the opening 38 in the back 72 of the sliding bolt 34, it can be optically determined in the back 42 of the wiper arm 12 whether the sliding bolt 34 has reached the installation position or the functional position.

The limbs 74 can have fluting 90 on their external side for the improved use of the sliding bolt during the movement along the wiper arm 12 (cf. FIG. 4). FIG. 4 furthermore shows that the sliding bolt 34 comprises a front end wall 92, which appealingly optically closes off the end region of the wiper arm 12, which opens at the front, for the sliding bolt that is moved backwards, and thus also protects the adaptor 16 received in the end region of the wiper arm 12.

A notch 94 is provided in the front wall 92, which receives the spoiler 30 of the wiper blade 14 during the pivoting of the wiper blade 14 with respect to the wiper arm 12 into the position shown in FIG. 8.

Figure 7:
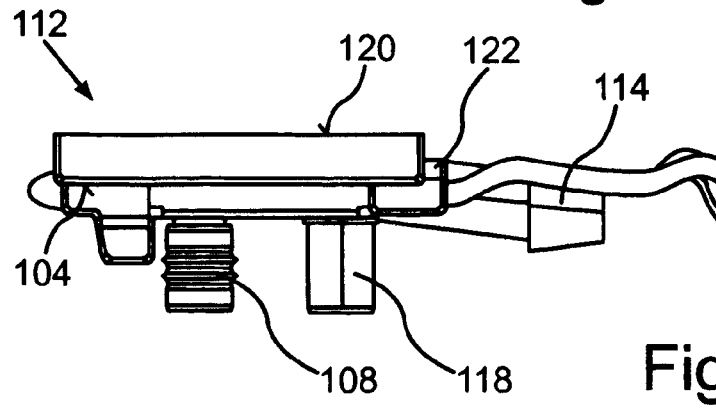
FIG. 7 illustrates the water plug coupled to the electrical connection according to FIG. 4 in a side view.

FIG. 4 additionally shows a water plug 96, which is pre-installed on the wiper arm 12 and via which the washer fluid is introduced into the channel pieces 50 in the adaptor 16 (cf. FIG. 2). The water plug 96 is locked in its fastened state with the wiper arm 12 on the end region of the wiper arm 12. Two latching noses 98 of the water plug 96 hereby engage with corresponding recesses 100, which are provided in the limbs 58 of the end region of the wiper arm 12. In addition, two side edges of a plate-like base plate 102 of the water plug 96 are located with their underside 104 (cf. FIG. 7) up on the limbs 58 of the wiper arm 12 opening upwards in this part of the end region, when the water plug 96 is locked to the wiper arm 12.

In the present case, the water plug 96 has an opening 106 in the base plate, which is designed to receive an electrical connection 108. The electrical connection 108 can be supplied with electrical energy via two cables 110 installed in the wiper arm 12. The electrical energy can be introduced into the washer fluid in the form of heat energy after the plug connector 62 of the adaptor 16 has been inserted into the electrical connection 108.

Figure 6:
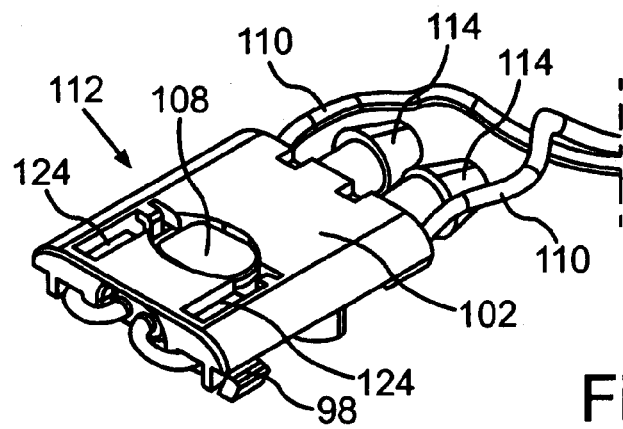
FIG. 6 illustrates the water plug coupled to the electrical connection according to FIG. 4 in a perspective view.

FIG. 6 shows that the water plug 96 couples to the electrical connection 108, which is thus designed as a Combi plug 112. Connecting pieces 114 designed integrally with the plate-shaped base plate 102 serve to connect two hose assemblies 116 (cf. FIG. 4) to the Combi plug 112. The hose assemblies 116 are assembled in the wiper arm, just as the cables 110. A line section 118 separated perpendicularly downwards from the respective connecting pieces 114 is inserted into the respective corresponding channel piece 50 during the connection of the adaptor 16 to the wiper arm 12, which is guided through the rider 20 (cf. FIG. 3).

A surface 120 of the base plate 102 closes to the extent of being flush with the back 42 of the wiper arm 12 when the Combi plug 112 is connected to the wiper arm 12. A contact 122 provided on the base plate 102 (cf. FIG. 7) hereby reaches over the back 42 of the wiper arm 12. In addition, two depressions 124 opening upwards are provided in the base plate 102 of the Combi plug 112 (cf. FIG. 6), with which a respective latching nose 126 engages, which protrudes downwards from the back 72 of the sliding bolt 34 (cf. FIG. 5).

FIG. 8 shows the sliding bolt 34 in its functional position, in which the front wall 92 of the sliding bolt 34 abuts on the front end of the wiper arm 12.

In the installation position of the sliding bolt 34 shown in FIG. 9, this is moved forwards and the front wall 92 is separated from the front end of the wiper arm 12. Accordingly, the rails 76 (cf. FIG. 5) do not lock the recesses 68 opening downwards in the limbs 58 in the end region of the wiper arm 12. The bar studs 66 on the guide frame 22 of the adaptor 16 can be inserted unhindered into these recesses 68, if the wiper blade arrangement 48 is to be attached to the wiper arm 12. During removal, the wiper blade arrangement 48 can be moved downwards accordingly (cf. movement arrow 70), if the sliding bolt 34 is located in the installation position shown in FIG. 9.

Figure 10:
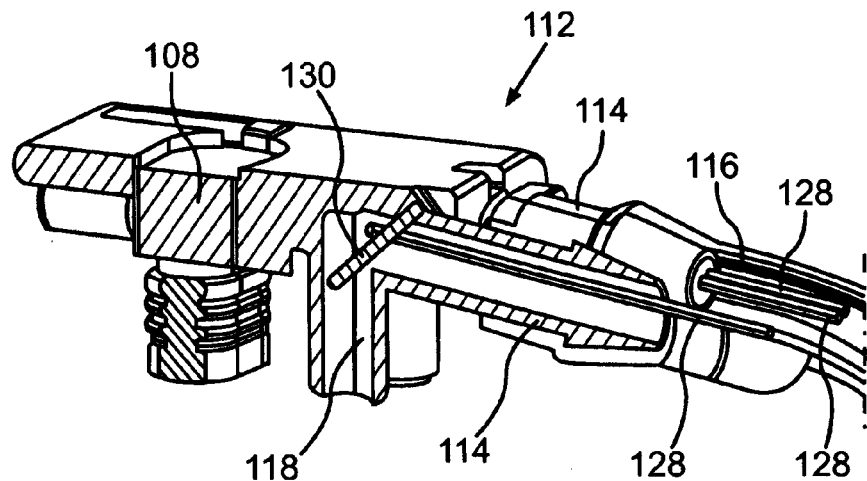
FIG. 10 illustrates an embodiment of the water plug, in which electrical heat conductors are installed in water lines of the same.

FIG. 10 shows an alternative design of the Combi plug 112, wherein a respective electrical heat conductor 128 is also installed within the connecting pieces 114. The heat conductor 128 forms a loop, which is guided around a locking pin 130, wherein the locking pin 130 is arranged at the transition of the connecting piece 114 to the line section 118. The heat conductor 128 thus runs in two strands through the respective hose assembly 116 from the locking pin 130. Such heat conductors 128 enable the heating of the washer fluid even when it is flowing through the hose assemblies 116 assembled in the wiper arm 12.

Figure 11:
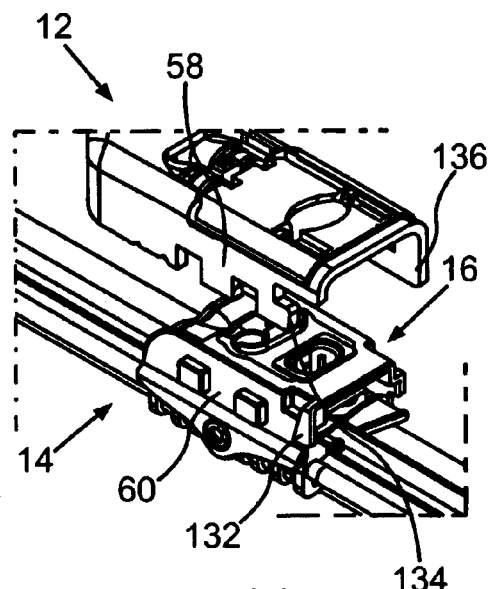
FIG. 11 illustrates an embodiment of the adaptor, which can be installed non-interchangeably on the respective wiper arm, in a view of a first side.
Figure 12:
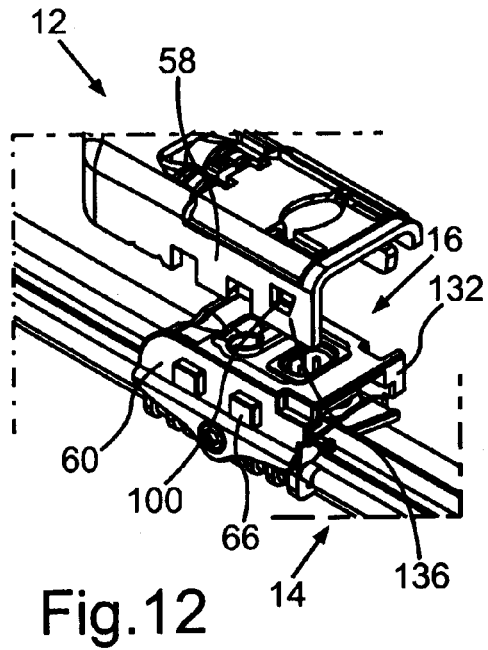
FIG. 12 illustrates the adaptor and the wiper arm according to FIG. 11 in a perspective view of the opposite side.

FIG. 11 shows, in an overall view with FIG. 12, how, by providing corresponding channels on the wiper arm 12 and the adaptor 16, it can be ensured that only the wiper blade 14 belonging to the wiper arm 12 is installed onto this.

Thus, for the adaptor 16, a guide tab 132 tapering upwards at a slight angle is provided on one of the side walls 60 of the guide frame 22 (cf. FIG. 11). This guide tab 132 reaches to the upper side of the adaptor 16. Likewise, a channel 134 is provided on sides of the wiper arm 12 in the region of the left limb 58, which has a lead-in chamfer. The guide tab 132 slides upwards along this channel 134, when the adaptor 16 is introduced from below into the end region of the wiper arm 12.

No guide tab is provided on the opposite side wall 60 of the adaptor 16, such that a wall piece 136 of the limb 58 arranged on this side of the wiper arm 12, which encloses the recess 100, can be moved past the front bar stud 66 unhindered, when the adaptor 16 is introduced from below into the end region of the wiper arm 12 (cf. FIG. 12).

Due to the mutually corresponding set-up of the wiper arm 12 in which the end region having the channel 134 and the wall piece 136 and of the adaptor 16 having the guide tab 132 on only one side, permutation protection can be ensured. Thus, for example, it can be ensured that a passenger-side wiper blade 14 can only be installed on the passenger-side wiper arm 12 and a driver-side wiper blade 14 can only be installed on the driver-side wiper arm 12. Likewise, permutation protection for a front windscreen wiper or a rear windscreen wiper can in this way be ensured.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A wiper blade arrangement, comprising:
   a wiper blade;
   a wiper arm of a windscreen wiper system of a vehicle; and
   an attachment element configured to secure the wiper blade to the wiper arm,
   wherein the wiper blade is coupled to at least one washer fluid channel for washer fluid via the attachment element,
   wherein washer fluid is introduced into the attachment element from the wiper arm,
   wherein the attachment element provides a relative movement of the wiper blade with respect to the wiper arm,
   wherein the attachment element includes a detachable plug coupled to the at least one washer fluid channel for washer fluid via a respective connecting piece and a rider configured to hold a spring strip of the wiper blade,
   wherein the detachable plug has at least one line section piece arranged perpendicularly downward relative to the connecting piece, and
   wherein the rider comprises a wiper-arm-side upper part and a wiper-blade-side lower part that are connected to each other via a central part of the rider, wherein the central part has at least one channel piece configured to accommodate the at least one line section piece of the detachable plug when the detachable plug is coupled to the rider so that the central part encloses a flow path of the washer fluid, wherein the central part has greater elasticity than the upper part and lower part of the rider.

2. The wiper blade arrangement according to claim 1, wherein the attachment element is secured to the wiper arm via a framework element, which is in contact with at least two external sides of the upper part that are opposite each other.

3. The wiper blade arrangement according to claim 2, wherein the framework element is installed on a rotational axis configured on the lower part.

4. The wiper blade arrangement according to claim 1, wherein the attachment element is installed onto the wiper arm in an installation direction, which runs at right-angles to a wiping surface defined by a wiping movement of the wiper blade.

5. The wiper blade arrangement according to claim 4, wherein the attachment element comprises at least one of:
   at least one projection protruding above a side wall of the attachment element, which is inserted into a recess on the wiper arm that is open in the installation direction during installation onto the wiper arm; and
   at least one guide element arranged on only one side wall of the attachment element, which is guided on a wiper-arm-side guide element having a lead-in chamfer during installation onto the wiper arm.

6. The wiper blade arrangement according to claim 1, wherein the attachment element has at least one electrical plug connector that is coupled to a wiper-blade-side electrical heat conductor, which is connected to a wiper-arm-side electrical connection during the connection of the attachment element to the wiper arm.

7. A connecting arrangement, comprising:
   a wiper blade arrangement, comprising
      a wiper blade;
      a wiper arm of a windscreen wiper system of a vehicle; and
      an attachment element configured to secure the wiper blade to the wiper arm,
      wherein the wiper blade is coupled to at least one washer fluid channel for washer fluid via the attachment element,
      wherein washer fluid is introduced into the attachment element from the wiper arm,
      wherein the attachment element provides a relative movement of the wiper blade with respect to the wiper arm,
      wherein the attachment element includes a detachable plug coupled to the at least one washer fluid channel for washer fluid via a respective connecting piece and a rider configured to hold a spring strip of the wiper blade,
      wherein the detachable plug has at least one line section piece arranged perpendicularly downward relative to the connecting piece, and
      wherein the rider comprises a wiper-arm-side upper part and a wiper-blade-side lower part that are connected to each other via a central part of the rider, wherein the central part has at least one channel piece configured to accommodate the at least one line section piece of the detachable plug when the detachable plug is coupled to the rider so that the central part encloses a flow path of the washer fluid, wherein the central part has greater elasticity than the upper part and lower part of the rider,
   a slider arranged on the wiper arm to fixedly hold the attachment element on the wiper arm, wherein the slider is displaceable along the wiper arm from an installation position into a functional position securing the attachment element.

8. The connecting arrangement according to claim 7, further comprising:
   at least one display on the wiper arm, by means of which a passing of the slider into the functional position or the installation position can be displayed to an operator.

9. The connecting arrangement according to claim 7, wherein the wiper arm has at least one latching notch, which, in the functional position or the installation position of the slider, engages with a latching nose arranged on the slider.

10. The connecting arrangement according to claim 7, wherein the slider has a back and two limbs, wherein at least one projection that encompasses the wiper arm from below or secures the attachment element in the functional position of the slider is arranged on the limbs of the slider.

* * * * *